March 17, 1931.                    E. J. SWEETLAND                    1,796,491
                                SUBMERGED DRUM FILTER
                        Filed Dec. 24, 1926          2 Sheets-Sheet 1
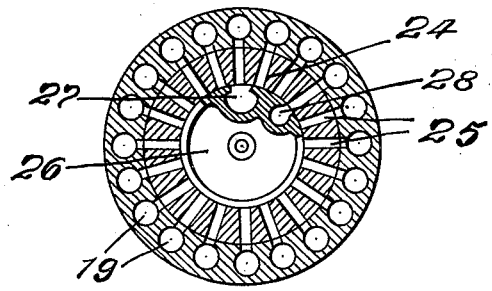
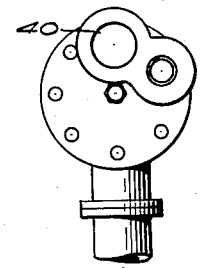
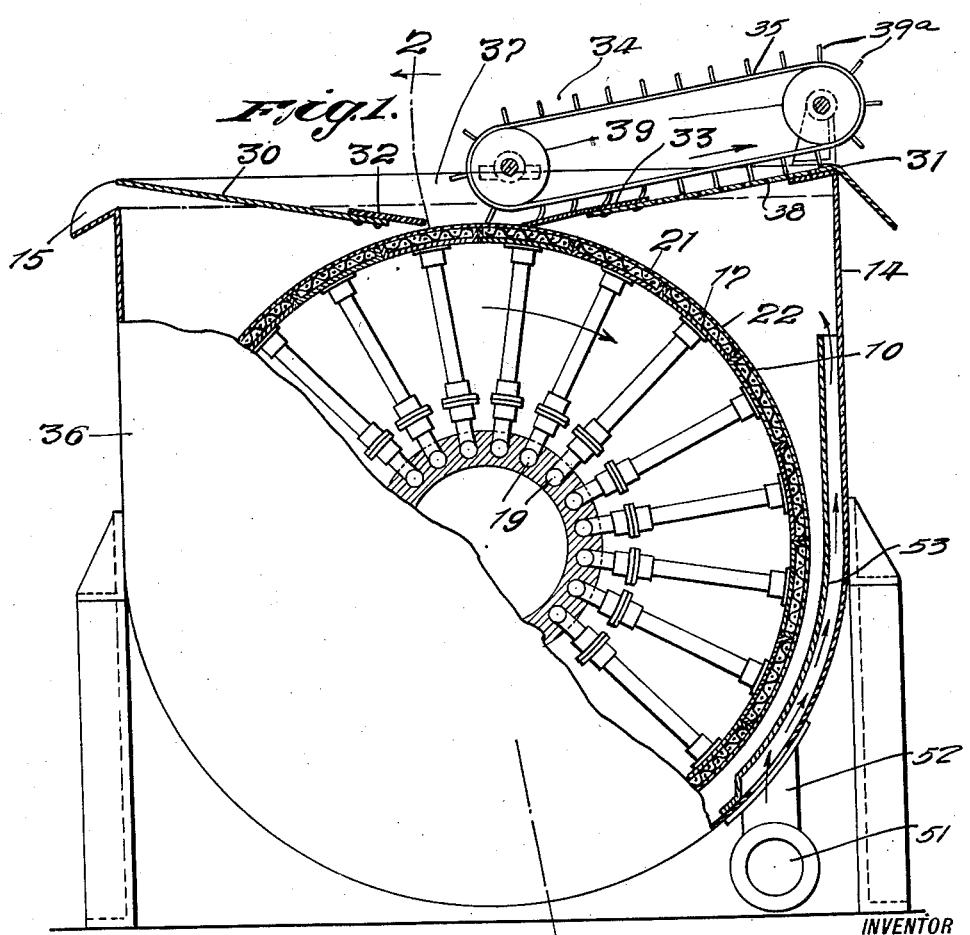
INVENTOR
Ernest J. Sweetland
BY
Hammond & Littell
ATTORNEY March 17, 1931.  E. J. SWEETLAND  1,796,491
SUBMERGED DRUM FILTER
Filed Dec. 24, 1926  2 Sheets-Sheet 2
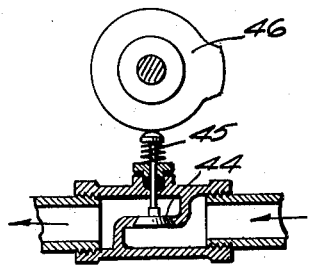
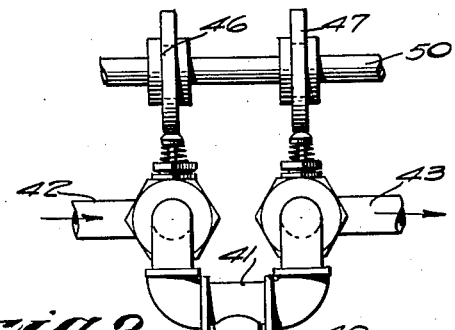
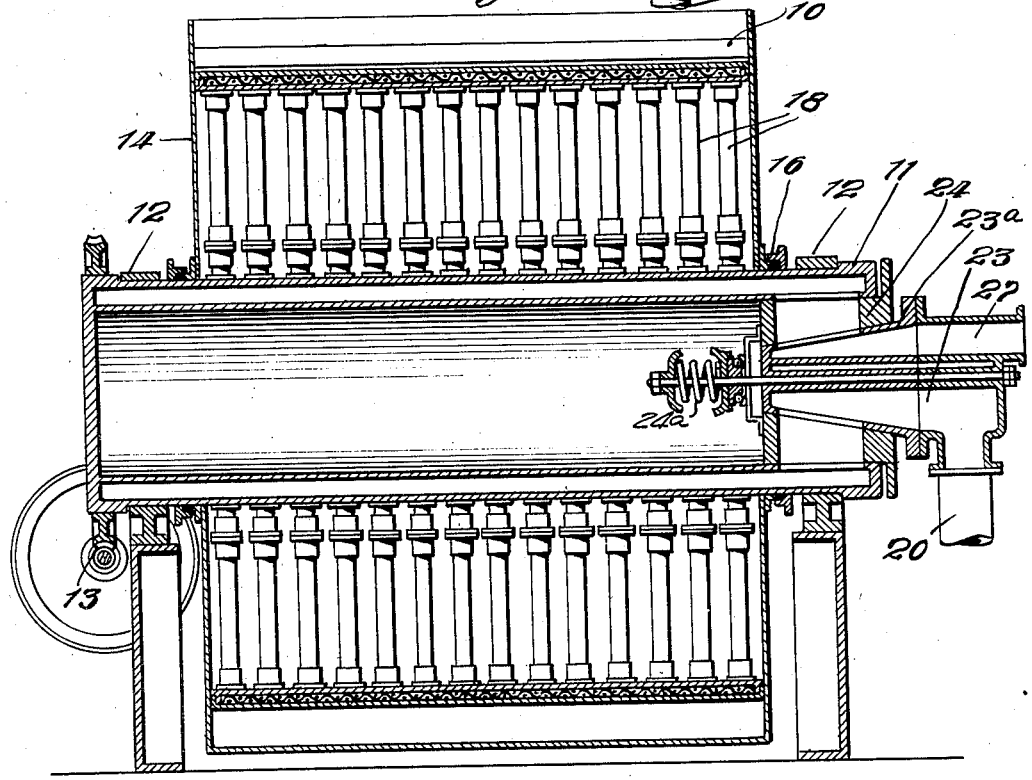
INVENTOR
ERNEST J. SWEETLAND
BY
Hammond & Littell
ATTORNEY Patented Mar. 17, 1931

1,796,491

UNITED STATES PATENT OFFICE

ERNEST J. SWEETLAND, OF HAZLETON, PENNSYLVANIA, ASSIGNOR, BY MESNE ASSIGNMENTS, TO OLIVER UNITED FILTERS INC., OF SAN FRANCISCO, CALIFORNIA, A CORPORATION OF NEVADA

SUBMERGED DRUM FILTER

Application filed December 24, 1926. Serial No. 156,846.

This invention relates to an improvement in continuous filters, more particularly of the rotating drum type. The invention is in the nature of a separate embodiment of apparatus from the broader invention described in my copending application Serial No. 168,528, filed Feb. 15, 1927.

The object of this invention is to provide a submerged type of rotating drum filter in which the effective area of the filtering drum, which is utilized for filtering, will be substantially the complete area of the drum. In the prior filters of this type, it has been customary to have the filtering drum rotate in a tank of the liquid to be filtered and to maintain the liquid in said tank at or below the level of the horizontal axis or mid point of the drum so that ordinarily less than fifty per cent. of the surface of the drum was in the liquid at a given time, the remaining fifty or more per cent. of the drum outside the liquid constituting an unused portion through which air could enter into the vacuum apparatus, thereby reducing the effectiveness thereof and at the same time partially drying the cake deposited on said unsubmerged portion of the drum.

The present invention overcomes these difficulties and provides a drum which is substantially completely submerged at all times, thereby utilizing substantially the entire area for filtering and utilizing the higher static head of the liquid in the tank and the increased efficiency of the vacuum apparatus to produce a maximum filtering efficiency with a minimum size of filter.

The invention is particularly applicable to the filtering or thickening of paper pulp, where a dry filter cake is not desired, but it will be readily apparent that the invention is by no means limited to such use.

In the embodiment of the invention, chosen to illustrate the same:

Figure 1 is a side elevation showing portions of the drum and the tank in sections;

Figure 2 is a sectional view substantially on the line 2—2 of Figure 1;

Figure 3 is a sectional view of the control valve;

Figure 4 is an end view of the plug of the control valve;

Figures 5 and 6 are detail views of a means for automatically controlling the dislodging of the cake from the surface of the drum.

In its preferred embodiment, my invention comprises a drum filtering surface 10 supported on a rotating horizantal hollow shaft 11 journaled in suitable bearings 12 and driven, for example, by means of the worm and worm-wheel 13. The drum 10 is enclosed in a tank or receptacle 14 which preferably extends a short distance above the top of the drum 10 so that when filled with liquid to the level of the overflow nozzle 15, the entire surface of the drum will be submerged. The shaft 11 passes through the walls of the tank 14 having a rotating fit therein by means of the stuffing boxes 16. The filtering surface of the drum may be formed in any suitable manner. It is preferred, however, to have a plurality of curved pans 17 extending from end to end of the drum, each communicating by means of a series of pipes 18 with one of the channels 19 in the outer wall of the shaft 11 so that when the suction from a suitable vacuum pump or barometric leg is communicated through the pipe 20 and valve 23 to the channels 19 the filtrate will be sucked through the filtering medium on the outer surface of the pans 17 and through the pipes 18 and channels 19 into a suitable receiver at the end of the pipe 20. The filtering surface of the pan 17 is preferably provided by means of a suitable grating 21 of coarse mesh wire, a cast perforated plate or the like, and this is covered with a filtering medium 22 of cloth, perforated metal, fine screen wire, or other suitable material, the filtering medium being suitably secured around the edges of the pan 17 to prevent leakage of the sludge therethrough.

The valve 23 comprises a stationary frusto conical plug 23$^a$ held to its seat by a coil spring 24$^a$ and around which the perforated collar 24, having passages 25 therein communicating with the channels 19, rotates. During the major portion of the rotation of the drum 10 in the tank 14, the channels 25 are in communication with the large compartment 26 of the valve plug 23ª and the suction from the source 20 is communicated through the channels 19 and pipes 18 to the filtering pans 17. During a small portion of the rotation, however, the passages 25 are in communication with a channel 27 of the plug 23 through which air, under pressure, may be forced in reverse direction through the passages 25, channels 19 and pipes 18 to create a back pressure in the pans 17 and dislodge the cake from the filtering surface. Immediately after passing out of communication with the compartment 27, the passages 25 come into communication with a separate channel 28 of the valve which is also connected to a suitable source of vacuum, but from which the filtrate is discharged into a separate receptacle from that receiving the filtrate from the pipe 20 for a purpose which will be later described.

Above the drum 10 the tank 14 is provided with two inclined separating plates 30 and 31 which separate the drum into a sludge compartment 36 of comparatively large size, and a cake discharge compartment 37 of comparatively small size. The drum rotates in a clockwise direction, as illustrated in Figure 1, and a flexible flap 32 of rubber or the like is provided on the inner end of the plate 30, which permits the drum with the filter cake thereon to pass under the flap 32, but prevents the return of the filter cake into the main sludge compartment. A similar flexible flap 33, which may be formed of suitable spring metal, rubber or the like, is secured to the edge of the plate 31 and is in rubbing contact with the surface of the drum 10 so as to scrape off any filter cake adhering to the drum as it passes under the flap 33 to collect the cake in the compartment 37 and prevent the return of the cake to the sludge compartment 36. The edges of the flaps 32 and 33 are spaced apart a distance slightly greater than the width of one of the pans 17. A flight conveyor 34 moves over the sloping plate 31 to elevate the cake as it is removed from the surface of the filter and discharge it from the tank 14. Perforations 38 in the plate 31 allow the excess liquid in the cake to drain through into the sludge compartment 36. It is to be understood that in many industries an absolutely dry cake is not desired, particularly in the paper pulp industry, where the concentrated cake is reintroduced wet into the process and no attempt is made to produce a dry cake in the present apparatus.

The pulp or sludge to be filtered enters the tank 14 through the manifold 51 and a plurality of pipes 52 and is directed upward by the baffle wall 53 so that it enters the sludge compartment 36 adjacent the entry of the pans 17 into this compartment, so that a large percentage of the solids may be deposited on the filter surface in this zone. The baffle 53 also prevents the incoming streams of sludge from disturbing the deposited cake.

In the operation of the filter, starting at the entry of a pan 17 into the sludge compartment 36 after the filter cake has been removed therefrom, as the pan 17 passes under the flexible flap 33, the passages 25 first comes into communication with the vacuum channel 28 in the valve 23 which creates a suction in the pan 17 drawing the filtrate therethrough and depositing a thin cake of pulp or other material on the filtering surface 22 of the pans. In the filtration of many substances and particularly the filtration of paper pulp the filtering medium to operate at commercial speed cannot be made of sufficient density to initially stop all flow of pulp fibers or other solid particles therethrough and the initial filtrate passing through the filtering medium will carry a substantial amount of solids and have a cloudy appearance. After a short period of filtration, however, the cake, pulp fibers or other materials builds up a sufficient thickness so that the cake itself acts as a filter medium and removes all of the solid particles returning a clear filtrate. It is for this purpose that the initial vacuum channel 28 is used. The cloudy filtrate from this channel is preferably handled so as to return this portion of the filtrate, containing short pulp fibers and other solid cake forming material, either directly to the sludge compartment 36 or to some previous point in the process where it will be eventually refiltered. Further rotation of the drum 10 moves the channels 25 out of communication with the channel 28 and into communication with the larger vacuum chamber 26 of the valve 23 so that during substantially more than three-fourths of the rotation of the drum and pan 17 through the sludge tank, the vacuum existing in the compartment 26 draws clear filtrate through the filter medium on the pan 17, building up a relatively thick filter cake thereon. This deposition and accumulation of cake continues until the pans 17 pass under the flexible flap 32 of the inclined plate 30 and until the entire filter surface of each pan 17 is in the space between the edges of the flaps 32 and 33. At this point the passage 25 communicating with the particular channel 19 comes into registry with the pressure channel 27 in the valve compartment.

In order to prevent the application of a back kick or internal pressure to the pan 17 before the entire filtering surface thereof has passed completely under the flap 32, the channel 27 is connected by means of the pipe 40 with a manifold 41 having branch connections 42 and 43 connecting, respectively, to a pressure and vacuum line. The branch connections 42 and 43 are each provided with a suitable spring seated valve 44, each valve having a stem 45 adapted to be actuated by means of the cams 46 and 47 on the shaft 50.

The shaft 50 is preferably driven from the means for rotating the drum so as to operate in synchrony therewith and is timed so as to maintain the valve in the suction line 43 open the major portion of the time and the valve in the pressure line closed so as to continue the suction on the filter pan 17. When, however, the rear edge of the pan 17 has emerged from beneath the flap 32, the cam 47 permits the valve in the vacuum line 43 to close and simultaneously opens the valve in the pressure line 42 causing a sudden reversal of pressure which elevates and loosens the cake from the filter surface 22. The cam 46 operating the valve in the pressure line 42 is timed so as to give a sudden, quick kick of back pressure, which is much more effective in removing cake than the slow application of internal pressure, which could be realized by the mere use of a rotating valve alone. The cam controlling the vacuum valve is timed so as to maintain this valve closed until after the pan 17 has passed beneath the flap 33. By maintaining the pan 17 under vacuum until the rear edges thereof pass under the flap 32, the cake is prevented from loosening and being scraped back into the sludge tank by the flap 32 and the release of vacuum, together with the back kick imparted by the air pressure, loosens the cake on the pans in the separating compartment and as the vacuum is not reapplied until after the pans have passed out of the separating compartment, substantially the entire cake can be removed from the filtering surfaces by the flap 33. The continued rotation of the drum 10 and the pan 17 after the loosening of the cake thereon by means of the back pressure brings the filtering surface of the pans 17 into contact with the flexible scraper 33, which scrapes away the filter or pulp cake, the clockwise rotation of the drum 10 causing the same gradually to feed to the right along the inclined plate 31. The final removal of the cake from the cake compartment is effected by the flight conveyor 34 comprising a belt 35 mounted to rotate around pulleys 39 at each side of the compartment and having flights of wood, rubber or other suitable material 40 extending from one belt to the other. It will be understood that what has been described with reference to one pan 17 occurs in sequence to all of the pans around the drum.

By the use of an apparatus of this type the filtering efficiency per unit of drum area is very materially increased. Substantially the entire surface of the drum is submerged at all times so that the static head of the liquid plus the fact that no free air is drawn through the filtering surface by the vacuum at any time together materially increases the filtration per unit of area and the increased area of the drum used for filtering gives a filtration rate many times greater than that attained by present apparatus.

While the invention has been described with particular reference to the filtration of paper pulp, it will be understood that the apparatus is not so limited, but may be used for the filtering and thickening of various other sludges, and that various modifications and changes may be made in details of construction without departing from the spirit of the invention or the scope of the appended claims.

What I claim is:

1. In a filter, in combination, a drum filter element, separate compartments therein, a tank containing said filter element, means maintaining a fluid level in said tank such that substantially the entire filter element is submerged, means for causing the formation of a filter cake on the separate compartments of said filter element and means for continuously removing filter cake from the surface of the individual compartments of said filter element as they reach the top of the tank and means for removing the cake from the tank while said filter element is thus submerged.

2. In a continuously operating suction filter comprising a tank containing a rotating drum filter element submerged in a liquid to be filtered, suction means for continuously accumulating filter cake in said tank at a level below the surface of the liquid to be filtered, and means for continuously discharging from the tank the filter cake thus accumulated, said means comprising a flight conveyor mounted on the top of the tank.

3. In a continuous filter of the drum type, a rotating filter drum, a tank extending above the top of the drum and adapted to contain a liquid to be filtered, means separating said tank into a sludge compartment of relatively large size and cake separating compartment of relatively small size, means to draw the liquid through said filter drum as it moves through the sludge compartment to deposit a cake of solids thereon, means to remove said cake from the drum as it moves through the cake separating compartment and means to separate the filtrate into cloudy and clear filtrate.

4. In a continuous filter of the drum type, a rotating filter drum, a tank extending above the top of the drum and adapted to contain a liquid to be filtered, means separating the top of said tank into a sludge compartment of relatively large size and a cake separating compartment of relatively small size, means to draw the liquid through said filter drum as it moves through the sludge compartment to deposit a cake of solids thereon, means to remove said cake from the drum as it moves through the cake separating compartment, and means to discharge the removed cake from said cake separating compartment and above the surface of the liquid.

5. In a continuous filter of the class described, the combination of a filter casing, a filter shaft journaled in said casing, a filter drum on said shaft adapted to rotate in said casing, conduits in said filter shaft in communication with portions of said drum, filter pulp in said casing adapted to substantially cover said drum, a thickened pulp compartment adjacent the top of the drum, means to form a filter cake on said drum, means to discharge said cake in said thickened pulp compartment, and conveyor means for discharging the thickened pulp from said compartment out of the top and over the side of the casing.

6. In apparatus of the class described, the combination of a continuous filter, a filter casing adapted to surround and support said filter drum, said casing being filled with filter pulp substantially covering said drum, said drum having a filter shaft, conduits in said shaft in communication with portions of said drum, vacuum means to form a cake on said drum, a cake-receiving compartment adjacent the top of the drum, quick-actuated valve mechanism to periodically interrupt said vacuum means, said quick-actuating mechanism adapted to periodically interrupt said vacuum means and to discharge filter cake from said drum, and into said compartment and elevating means for elevating the filter cake from said compartment over the top of the casing.

7. In a continuous filter of the class described having a filter drum divided into separate elements, a tank surrounding the drum adapted to receive a filter pulp substantially covering the top of said drum, means for rotating the drum thru said filter pulp, vacuum means for building up the filter cake on the surface of the respective elements of said drum and means for removing the cake from said elements which comprises a cake-receiving compartment adjacent the top of said drum, said cake-receiving compartment embracing but a single complete element, synchronously actuating cam mechanism for relieving the vacuum and for causing a blow-back pressure in the respective element as it reaches the opening in said discharge compartment to discharge the cake therein and a flight conveyor for elevating and removing the thickened cake from said compartment over the side of the filter tank.

8. In a rotary continuous drum filter of the class described, a filter tank adapted to receive filter pulp therein, a drum adapted to be rotated completely submerged in said tank, means to create a suction on the surface of said drum to cause a cake to build up thereon, means to conduct filtrate through the surface of the drum during the major portion of a cycle of revolution of the drum, means to create a back pressure on a portion of said surface below the level of the pulp to be filtered to aid in removing the cake from said surface, additional means to remove the cake from the top of the drum, a compartment adjacent the top of the drum to segregate the discharged filter cake therein, and additional means to remove the discharged cake over the top of the filter tank.

In testimony whereof, I have affixed my signature to this specification.

ERNEST J. SWEETLAND.